United States Patent [19]
Todd

[11] 4,334,406
[45] Jun. 15, 1982

[54] FUEL SUPPLY SYSTEM

[75] Inventor: Geoffrey C. Todd, Evesham, England

[73] Assignee: Dowty Fuel Systems Limited, Cheltenham, England

[21] Appl. No.: 257,249

[22] Filed: Apr. 24, 1981

Related U.S. Application Data

[63] Continuation of Ser. No. 952,254, Oct. 17, 1978.

[30] Foreign Application Priority Data

Mar. 15, 1978 [GB] United Kingdom ............... 10192/78

[51] Int. Cl.³ .................................................. F02C 9/08
[52] U.S. Cl. ................................. 60/223; 60/39.09 R; 123/198 D
[58] Field of Search ............ 123/198 D, 198 DB, 462; 60/223, 39.09 R, 39.28 R

[56] References Cited

U.S. PATENT DOCUMENTS

| | | | |
|---|---|---|---|
| 2,686,561 | 8/1954 | Isreeli | 60/223 |
| 2,958,191 | 11/1960 | Williams | 60/39.09 R |
| 2,968,347 | 1/1961 | Farkas | 60/39.09 R |
| 3,023,575 | 3/1962 | Haase | 60/39.09 R |
| 3,293,847 | 12/1966 | Rogers | 60/223 |
| 3,839,361 | 9/1974 | Keely | 123/32 EK |

*Primary Examiner*—Charles J. Myhre
*Assistant Examiner*—Carl Stuart Miller
*Attorney, Agent, or Firm*—Young & Thompson

[57] ABSTRACT

A liquid fuel supply system for an engine having a power demand adjuster, e.g. a manually operable control acting in conjunction with operational factors associated with the engine to determine fuel flow to the engine, in which apparatus is provided responsive to failure of part of the fuel system to cause an auxiliary to become effective to control fuel flow to the engine in accordance with the setting of the power demand adjuster, the arrangement being that for any setting of the power demand adjuster the fuel flow to the engine will not alter instantaneously when the auxiliary becomes effective to control fuel flow. It may be arranged that the relationship between fuel flow to the engine and the setting of the power demand adjuster may alter within a short period after the auxiliary has become effective.

3 Claims, 3 Drawing Figures

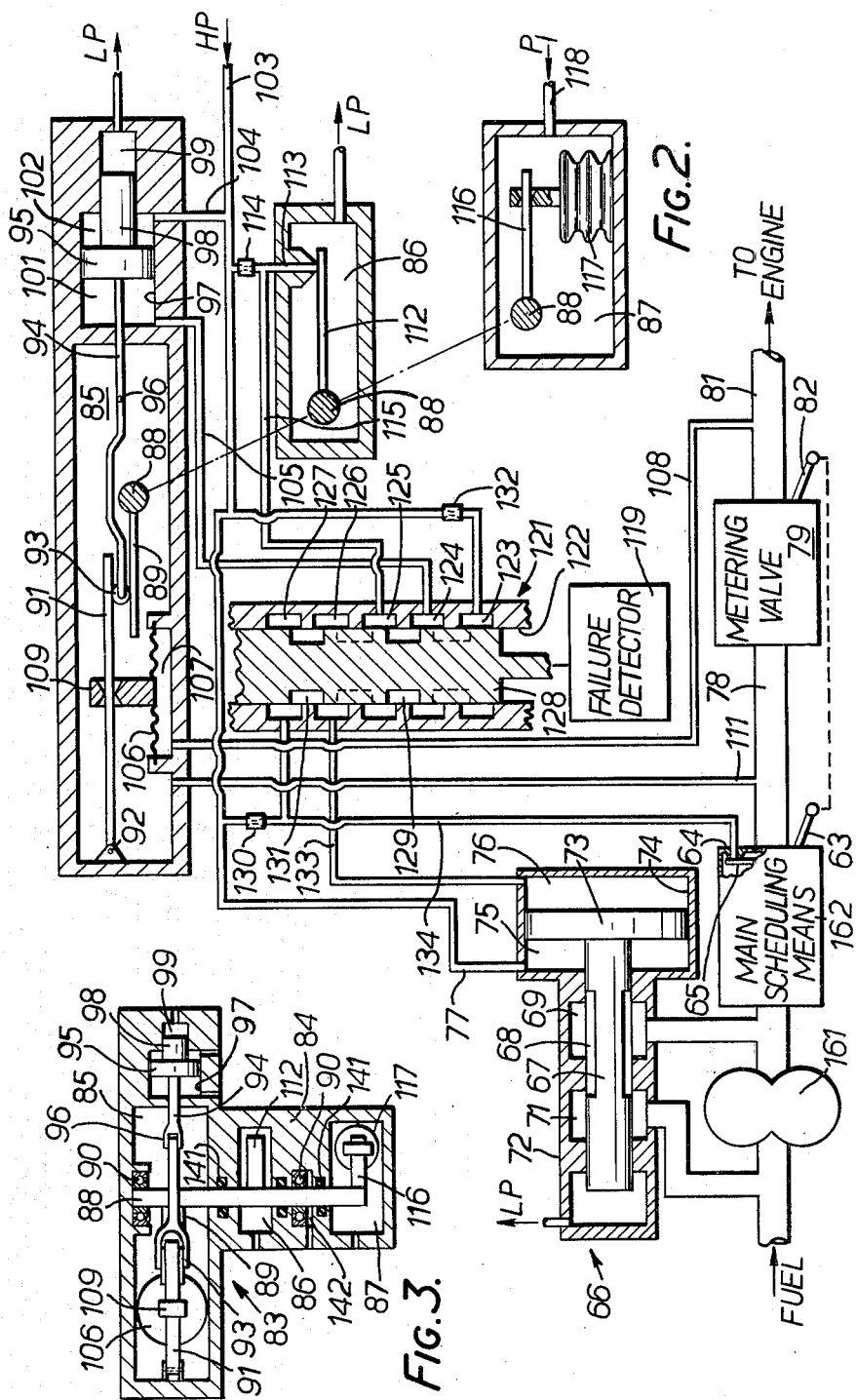

FUEL SUPPLY SYSTEM

This is a continuation, of application Ser. No. 952,254, filed Oct. 17, 1978.

This invention relates to a liquid fuel supply system or use with an engine.

A liquid fuel supply system for such an engine may be of an exceedingly complicated nature to control the engine accurately in compliance with at least a power demand signal and with one or more signals dependent on the conditions of operation of the engine. The power demand signal may be provided by a manually operable control or an automatic control for selecting engine power. The operational factors may, for example be one or more of engine speed, engine air inlet temperature and engine air inlet pressure. Failure of a liquid fuel supply system to supply fuel accurately can result in failure of the engine to operate correctly and, in turn, this may result in damage and danger to human life.

The present invention sets out to provide a liquid fuel supply system which is capable of accommodating some failure within the system without causing failure of the engine to operate correctly.

In accordance with one embodiment of the present invention a liquid fuel supply system includes a source of liquid fuel under pressure, a primary control which may be manually or automatically adjusted, a fuel outlet spill, valve means, for controlling fuel flow from the source to the outlet, associated with, a main fuel flow scheduling means, an auxiliary fuel flow scheduling means, both scheduling means being simultaneously adjustable in response to the setting of said primary control detector responsive to failure of the main scheduling means to cause the auxiliary scheduling means to become effective in controlling the spill valve means, movable means associated with the auxiliary scheduling means continuously adjustable by the flow determined by the main scheduling means when operative, to ensure that whenever the detector causes the auxiliary scheduling means to become operative, the fuel flow for any fixed setting of the primary control will not alter instantaneously and delay means operable to ensure that the fuel flow will only change from that instantaneous value at a slow rate.

The primary control may be a manually operable control.

The main scheduling means will always be controlled by the primary control and at least one other signal derived from an operational condition of the engine when controlling fuel flow to the outlet, and the auxiliary scheduling means may respond solely to the primary control when controlling fuel flow to the outlet.

Two embodiments of the invention will now be described with reference to the accompanying drawings, in which:

FIG. 2 is a diagrammatic illustration of the second embodiment, and,

FIG. 3 is a cross-section through a structure forming part of the FIG. 2 embodiment.

Figure 1:
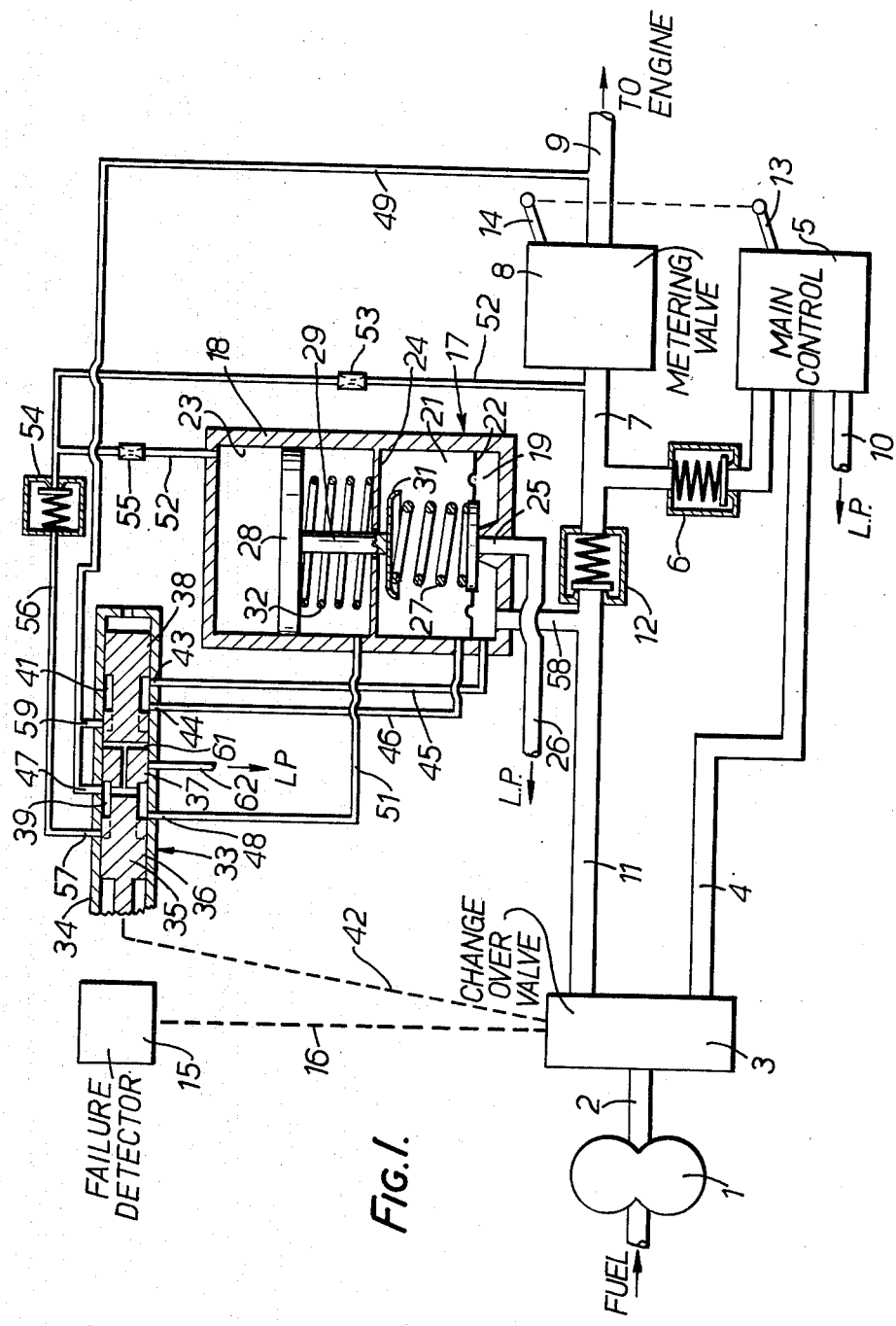
FIG. 1 is a diagrammatic illustration of the first embodiment.

Initially reference is made to the FIG. 1 embodiment of the invention. This embodiment is for the supply of fuel to an engine. The source of fuel at pressure is a gear pump 1, fuel being delivered through pipe 2 to a change-over valve 3. For normal operation of the fuel system the change-over valve will direct fuel from pipe 2 into pipe 4, main control 5, non-return valve 6, pipe 7, metering valve 8 and outlet 9 to the engine.

The main control is a conventional fuel flow scheduling structure controlling a spill valve which is embodied in the main control and which effects control of flow to the outlet by spilling back to low pressure through pipe 10 some of the fuel flow received from pipe 4, whereby the remainder of the fuel fed to outlet 9 is adjusted to the required fuel flow rate. The main control 5 is under the controlling influence of the manual lever 13 and to at least one signal derived from operating conditions of the engine.

The metering valve 8 is a part of the auxiliary supply control means and comprises a variable throttle adjustable by means of a manual lever 14. The levers 13 and 14 are mechanically connected together for joint simultaneous manual adjustment.

A failure detector 15 of conventional construction will operate to detect failure of the main control 5 and on failure detection, detector 15 will move the change-over valve 3 through linkage 16, e.g. a servo piston, so that fuel instead of leaving through pipe 4 leaves the change-over valve through pipe 11.

The auxiliary scheduling means comprises a second spill valve device 17 in combination with the metering valve 8. The device 17 comprises a casing 18 within which are located a pair of chambers 19 and 21, separated by a flexible diaphragm 22, and a cylinder 23 separated from chamber 21 by an internal wall 24. Within the wall of chamber 19 a valve seat 25 is located which is connected by pipe 26 back to a low pressure zone, such as the fuel tank. The diaphragm 22 co-operates with seat 25 to open or close the seat, and a spring 27 loads diaphragm 22 against seat 25. The load in spring 27 is determined by the force exerted by piston 28 sliding in cylinder 23, such force being exerted through piston rod 29 and spring cap 31. Spring 27 forms the bias means. A spring 32 within cylinder 23 acts on piston 28 so that in the absence of liquid at pressure, the spring cap 31 will rest on wall 24 and determine a minimum load in spring 27.

An emergency control valve 3 comprises a cylinder 34 having a piston valve 35 slidable therein to either of two positions. The valve 35 comprises three lands 36, 37 and 38 separated by waisted portions 39 and 41. The piston valve 35 in the illustrated position is set for normal operation of the fuel system with the main control operative, but on detection of failure the piston valve 35 will be moved by the change-over valve 3 through mechanical link 42 to the left as seen in the drawing, so that the waisted portions 39 and 41 take up the positions shown in dotted lines.

In the illustrated position of piston valve 35 waisted portion 41 will connect together a pair of ports 43 and 44, such ports being connected by pipes 45 and 46 respectively to chambers 19 and 21, such that no pressure difference exists across diaphragm 22. Also in the illustrated position the waisted portion 39 will connect together ports 47 and 48. Port 47 is connected by pipe 49 to delivery 9 and port 48 is connected by pipe 51 to the end of cylinder 23 adjacent to wall 24. Pipe 52 extends from pipe 7 through restrictor 53 to check valve 54 and to a restrictor 55. From restrictor 55 pipe 52 connects to the end of cylinder 23 remote from wall 24. From check valve 54 a pipe 56 connects to a port 57 in valve cylinder 34.

In the normal operating condition with the main control 5 operative, the fuel flow is determined by main control 5 and its included spill valve, such flow passing through non-return valve 6 and metering valve 8, to the outlet 9. As fuel flows through the metering valve 8 a pressure drop will occur which will be dependent on the setting of manual control 14. Pressure from pipe 7 passes through restrictors 53 and 55 into cylinder 23 to urge piston 28 to compress springs 32 and 27. Pipe 49 carries pressure from pipe 9 through port 47, waisted portion 39, port 48 and pipe 51 into the end of cylinder 23 adjacent to wall 24. Thus effectively the pressure drop occurring across metering valve 8 is fed to piston 28 and the resulting spring load exerted by spring 27 will act to hold diaphragm 22 on seat 25. During operation of the main control 5, the second spill valve 17 will be continuously adjusted so that, at any instant, the amount it would spill if it were operative would be the same as that which is being spilled by the main control 5.

In the event of failure of the main control 5, the failure detector 15 will operate and will move change-over valve 3 which, in turn, will move the piston valve 35. Fuel will then flow to the outlet 9 through pipe 11, nonreturn valve 12 and metering valve 8. Fuel will also flow through pipe 58 from pipe 11 into chamber 19. Movement of piston valve 35 to the failure position will close port 43 and will connect port 44 to port 59, port 59 being connected also to pipe 49. Thus liquid at pressure from outlet 9 will have access into chamber 21 and pressure drop occurring across metering valve 8 will be instantaneously operative across diaphragm 22. The force produced on diaphragm 22 is opposed to the bias force supplied by spring 27 and the diaphragm instantaneously will lift to allow spill flow through port 25 back to low pressure to maintain the fuel flow through the metering valve at the value it had instantaneously before operation of the valve 15. Thus, for a fixed setting of the manual lever 13, 14, there will instantaneously be no change in the flow of fuel to and hence the operation of the engine, operation of the valve 15 may also be arranged to operate a warning device so that the person controlling the engine is made aware of the occurrence of change over to the auxiliary supply system.

Movement of piston valve 35, on operation of the change-over valve 3, will also move the waisted portion 39 so that port 57 is connected to port 48. Within piston valve 35 a low pressure port 61 connects the low pressure side of pump 1 to waisted portion 39 and movement of piston valve 35 to the left as seen in FIG. 1 will connect port 61 to a low pressure port 62 into cylinder 34. Thus, ports 57 and 48 are connected to low pressure. In turn, this causes the end of cylinder 23 adjacent wall 24 to be connected directly to low pressure and the end of cylinder 23 away from wall 24 to be connected through restrictor 55 to a low pressure determined by pressure controlled valve 54. The action of springs 27 and 32 on piston 28 can then discharge liquid from cylinder 23 through restrictor 55, the restrictor 55 acting as a delay means, its size determining a time period over which the piston may move to a position determined by the low pressure set by check valve 54. This time period will conveniently be about thirty seconds. During this time period the loading force on diaphragm 22 will fall to a constant value determined by check valve 54 and the diaphragm 22 will thus operate to spill a gradually increasing amount of fuel through port 25. Thus, at the instant of change-over from the main control to the auxiliary control, the instantaneous amount of fuel supplied by the latter is the same as that which was being supplied by the former, and thereafter it can only change from that value at a slow rate. The time period during which that change takes place is adequate for the person controlling the engine to realise that the auxiliary control is operating and to make careful adjustment of the manual lever 14, correctly to control the fuel flow to the engine. After expiry of the time period control is effective by variation of the throttling effect of metering valve 8 and the action of pressure determined by check valve 54 to maintain a constant compression of spring 27 and thus to maintain a constant force on diaphragm 22 to spill fuel from pipe 11 so that flow to outlet 9 produces a constant pressure drop across the metering valve. Subsequently, the manual lever is then the sole control of fuel flow to the engine.

Reference is now made to FIGS. 2 and 3 of the drawings. The embodiment shown in these figures differs in one respect from that of FIG. 1 in that a single spill valve, common to both the main control and the auxiliary control is used. The source of liquid fuel to the system is a gear pump 161, fuel entering initially into a main scheduling means 162. Scheduling means 162 carries a manual lever 63 which forms a power demand adjuster and will supply a signal into the main scheduling means of required power demand. The main scheduling means will also receive signals of engine speed, air inlet temperature and air inlet pressure and will determine a desired fuel flow, control being exercised through the medium of a servo vent 64 controlled by a lever 65.

The actual control of fuel flow rate is by means of a spill valve 66. This valve comprises a piston 67 having a waisted portion 68 operative to vary the restrictive effect between a pair of ports 69 and 71 in a cylinder 72 within which the piston 67 slides. Port 69 is connected to the fuel flow exit from pump 161, whilst port 71 is connected to the input to the pump 161, so that the restrictive connection exerted by the spill valve forms a controlled spill connection from the exit to the input of pump 161. The piston 67 is adjusted in position by means of a servo piston 73, slidable within a cylinder 74, the piston dividing cylinder 74 into two working chambers 75 and 76. Working chamber 75 is effective over the area of piston 73 less the cross-sectional area of piston 67 and is subjected to fuel at high pressure from pipe 77. The working space 76 is effective over the whole area of piston 73 and the pressure supplied to space 76 is determined by the vent 64 in a manner to be described. The area ratio of the areas of piston 73 presented to chambers 75 and 76 has a predetermined value whose importance will be appreciated later.

Fuel leaving scheduling means 162 passes through pipe 78 into an adjustment means formed by metering valve 79 and this flow leaves the metering valve through the outlet 81 leading to the engine. The metering valve 79 has a manual lever 82 forming part of the power demand adjuster and mechanically linked to the lever 63. The construction of the valve 79 is substantially the same as for the valve 8 of FIG. 1.

The metering valve 79 operates in conjunction with a valve unit 83 which is illustrated in section in FIG. 3. The metering valve 79 and valve unit 83 together form the auxiliary fuel flow scheduling means. The valve unit 83 comprises a casing 84 within which are formed three separate chambers, 85, 86 and 87 which are effectively isolated from one another by means of seals 141 and a vented space 142. These chambers and the enclosed mechanisms are shown separately in FIG. 2. A single rotary shaft 88 extends through the three chambers being suitably supported in ball bearings 90. In chamber 85 the shaft 88 carries a lever 89 which extends in parallel overlapping relation with a lever 91 pivotally mounted at 92 on the wall of chamber 85. A roller 93 is slidable between levers 89 and 91, such roller being adjustable in position by means of a rod 94 extending from a servo piston 95. The rod 94 in chamber 85 includes a hinge 96. Servo piston 95 slides in a cylinder 97 and includes a plunger 98 which extends into a co-axial cylinder 99. Thus within cylinder 97 two working spaces 101 and 102 are formed. Working space 101 which surrounds the rod 94, operates on a large area of piston 95 and space 102 which surrounds plunger 98 operates on a smaller area of piston 95. The area ratio for the piston 95 is arranged to be exactly the same as the area ratio for the piston 73. The cylinder 99 is connected to a low pressure zone so that no pressure effect is exerted on plunger 98. Working space 102 is connected directly to a high pressure connection 103 through a pipe 104. Working space 101 is connected to a variable pressure through a pipe 105.

Also within chamber 85 a flexible diaphragm 106 is mounted so as to define a closed space 107 fed with pressure through pipe 108 from the delivery 81. The diaphragm 106 is connected through a connector 109 to the lever 91. The chamber 85 is connected through pipe 111 with the pipe 78 carrying fuel into metering valve 79. Thus the diaphragm 106 is subjected to the effective pressure drop occurring across metering valve 79.

Within chamber 86 shaft 88 carries a lever 112 which co-operates with a servo vent 113. Vent 113 is connected to high pressure 103 through a restrictor 114. A pipe 115 carries pressure from vent 113 for control purposes.

In chamber 87 the shaft 88 carries a lever 16 in connection with an evacuated bellows 117. The chamber 87 is subjected through connection 118 to a control pressure P1 from the engine. This pressure is usually the atmospheric pressure of air entering into the engine and provides a control signal which has a relationship with the altitude of the engine. The capsule 117 will therefore exert a torque on shaft 88 in proportion to pressure P1.

A failure detector 119 of known construction responds to failure of the scheduling means 162 and is connected to operate a valve 121. The valve 121 comprises a cylinder 122 having five spaced ports 123, 124, 125, 126 and 127. A piston 128 is axially slidable in cylinder 122 and is provided with a pair of waisted portions 129 and 131. The full line positions of portions 129 and 131 represent the positions for normal operation of the scheduling means 162. Port 123 is connected through restrictor 132 to the high pressure supply 103. Port 124 is connected through pipe 105 to the working space 101 of servo cylinder 97. Port 125 is connected through pipe 115 to the servo vent 113. Port 126 is connected through pipe 133 to the working space 76 of servo cylinder 74. Port 127 is connected through pipe 134 to the servo vent 64 associated with main scheduling means 162. Pipe 134 is also connected by restrictor 130 with the high pressure connection 103.

In normal operation of the FIG. 2 system the power demand set by lever 63, 82, acting through main scheduling means 162 will determine the amount of opening of vent 64 and thus determine a flow of fuel from high pressure through restrictor 130. In turn, this will determine a pressure in pipe 134 which is fed through waisted portion 131 of piston valve 128 and pipe 133 to working space 76 of spill valve 66. In this way the control of pressure in working space 76 will determine a position of equilibrium for servo piston 73 in which a by-pass for fuel between the exit and the entry of pump 61 allows a sufficient flow rate of fuel through scheduling means 162 to satisfy the various signals supplied thereto. This normal fuel flow rate passes through metering valve 79 to the engine and the pressure drop across the metering valve will operate on the diaphragm 106 to swing the lever 91. The roller 93 will then transmit this to lever 89 and shaft 88 to adjust the opening of the vent 113. The vent 113 is connected through pipe 115, waisted portion 129 and pipe 105 to working space 101 of servo cylinder 97 and will control pressure in working space 101 to cause movement of servo piston 95. This movement will adjust roller 93 to balance the torque on shaft 88. At the torque balance condition the force developed on piston 95 from working space 101 is balanced by the force developed by high pressure acting in the working space 102 so that piston 95 exerts no force. In determining this balance the pressure P1 to the engine will also exert a torque on the shaft 88 through the medium of the capsule 117. Also the pressure at vent 113 will exert a slight torque on shaft 88. The roller 93 when in its balanced position forms a bias means since it will determine fuel flow to the engine if the main scheduling means should fail.

Thus, during operation of the main scheduling means, the auxiliary scheduling means is being continuously adjusted so that the amount of fuel it would supply if it were operating is instantaneously the same as that amount being supplied by the main scheduling means.

A failure of scheduling means 162 will be detected by detector 119 and piston valve 128 will be moved to its second position in which the waisted portions occupy the dotted positions to cause the following changes in connection, the levers 63 and 82 remaining at a fixed setting:

A. The servo vent 64 is completely disconnected.
B. The servo vent 113 is disconnected from working space 101 and is connected to working space 76 through pipes 115 and 133 whereby the pressure drop of fuel flow passing through metering valve 79 acts through diaphragm 106 to produce torque on lever 91 and to control spill valve 66 through roller 93 and vent valve 113. The facts that: (a) roller 93 is in a balanced position, (b) that the area ratio of servo piston 95 is the same as the area ratio of servo piston 73, and, (c) both of these servo pistons receive high pressure from the same supply 103, will ensure that at the instant of change-over for a fixed setting of lever 82, the controlled pressure in working space 76 will not change and thus the spill valve will not instantaneously alter. It will be seen, therefore, that roller 93 acts as a bias means to control servo piston 73 on failure of the main scheduling means.
C. The working space 101 will be connected through restrictor 132 and waisted portion 129 to the high pressure connection 103 providing the same pressure in both of the working spaces 101 and 102 whereby force will act on servo piston 95 urging it and roller 93 to the right as seen in FIG. 2, the speed of movement being determined by the restrictive effect of restrictor 132. The restrictor is arranged for movement of piston 95 to its limit to take about thirty seconds and, during this time, for a given position of lever 82 the fuel flow will change slowly and gradually from the instantaneous value it has at the instant of change-over. The person controlling lever 82 will be made aware of the occurrence of failure by means of a warning also operated by valve 121 and will expect the gradual change in controlling effect. The predetermined relation between the position of lever 82 and fuel flow is influenced by the pressure P1 fed to act on capsule 117 and is so arranged that with reduction of P1 the fuel flow will be reduced. The effect is obtained by virtue of the fact that P1 through the medium of capsule 117, will exert a torque on shaft 88 and will vary the effective balance of shaft 88 and thus the opening of servo vent 113 to control the position of spill valve servo piston 73.

Whilst in both embodiments the control of fuel flow is by means of one or more spill valves arranged to spill flow from the delivery of the gear pump, it is within the scope of the invention to use other methods of fuel flow control, for example, the fuel pump may be a variable displacement pump whose displacement is adjustable by the main and the auxiliary scheduling means or, again, the pump may be a centrifugal pump having a delivery throttle valve adjustable by the main and the auxiliary scheduling means.

I claim:

1. In a liquid fuel supply system for an engine, pump means for supplying fuel under pressure, normally-operative main supply control means for controlling the supply of fuel under pressure to the engine in accordance with the setting of a primary control and in accordance with at least one secondary control signal derived from an operational condition of the engine, normally-inoperative auxiliary supply control means for controlling the supply of fuel under pressure to the engine in accordance at least with the setting of said primary control, said auxiliary supply control means being inoperative to control the supply of fuel when the main supply control means is operative to control the supply of fuel, being subject to the setting of said primary control both when inoperative and when operative, and having a metering valve through which fuel from the main supply control means passes when the auxiliary supply control means is inoperative, change-over valve means operable to render, substantially instantaneously, the main supply control means inoperative to control the supply of fuel and the auxiliary supply control means operative to control the supply of fuel, movable means subject to the pressure drop across the metering valve when the main supply control means is operative to control the supply of fuel and operable on the auxiliary supply control means whereby, in combination with the setting due to said primary control, the amount of fuel supplied to the engine by the auxiliary supply control means at the instant of operation of the change-over means will be the same as that amount which was being supplied by the main supply control means at that instant and fuel flow restricting means in said auxiliary supply control means operable to ensure that immediately after operation of the change-over means the amount of fuel supplied to the engine by the auxiliary supply control means can change from that amount only at a slow rate in the absence of any change in the setting of the primary control.

2. A liquid fuel supply system as claimed in claim 1 in which the main supply control means includes a spill valve and the auxiliary supply control means includes a spill valve.

3. A liquid fuel supply system as claimed in claim 2 in which the spill valve of the main supply control means is the same spill valve as that of the auxiliary supply control means.

* * * * *